(12) United States Patent
O'Neill et al.

(10) Patent No.: US 9,972,850 B2
(45) Date of Patent: May 15, 2018

(54) FUEL CELL COMPONENT HAVING DIMENSIONS SELECTED TO MAXIMIZE A USEFUL AREA

(75) Inventors: Jonathan Daniel O'Neill, Manchester, CT (US); Timothy W. Patterson, West Hartford, CT (US)

(73) Assignee: Audi AG, Ingolstadt (DE)

( * ) Notice: Subject to any disclaimer, the term of this patent is extended or adjusted under 35 U.S.C. 154(b) by 648 days.

(21) Appl. No.: 14/405,136

(22) PCT Filed: Jun. 5, 2012

(86) PCT No.: PCT/US2012/040848
§ 371 (c)(1),
(2), (4) Date: Dec. 2, 2014

(87) PCT Pub. No.: WO2014/011140
PCT Pub. Date: Jan. 16, 2014

(65) Prior Publication Data
US 2015/0214558 A1    Jul. 30, 2015

(51) Int. Cl.
*H01M 8/02* (2016.01)
*H01M 8/0265* (2016.01)
(Continued)

(52) U.S. Cl.
CPC ....... *H01M 8/0265* (2013.01); *H01M 8/0247* (2013.01); *H01M 8/0258* (2013.01);
(Continued)

(58) Field of Classification Search
None
See application file for complete search history.

(56) References Cited

U.S. PATENT DOCUMENTS

| 6,884,536 B1 | 4/2005 | Hatoh et al. |
| 2004/0219410 A1 | 11/2004 | Tanaka et al. |
| | (Continued) | |

FOREIGN PATENT DOCUMENTS

| JP | 2007-533067 A | 11/2007 |
| JP | 2008-047293 | * 2/2008 |
| | (Continued) | |

OTHER PUBLICATIONS

Extended European Search Report dated Dec. 22, 2015 for EP Application No. 12881003.3-1360 / 2856544, 7 pages.
PCT International Search Report dated Jan. 22, 2014 for PCT Application No. PCT/US2012/040848 (3 pages).

*Primary Examiner* — Jonathan Crepeau
(74) *Attorney, Agent, or Firm* — Seed IP Law Group LLP

(57) ABSTRACT

An exemplary fuel cell component includes a generally planar body having a total area defined by a length and width of the body. A first portion of the total area is occupied by a first fuel cell features that renders the first portion unusable for at least one fuel cell function. A second portion of the total area is occupied by a second fuel cell feature that renders the second portion unusable for the fuel cell function. A third portion of the total area is considered an active area of the component that is useful for the fuel cell function. An aspect ratio of the length to the width of the generally planar body is dependent on a dimension of the first portion and a dimension of the second portion.

15 Claims, 2 Drawing Sheets

(51) Int. Cl.
  *H01M 8/0258* (2016.01)
  *H01M 8/0267* (2016.01)
  *H01M 8/0271* (2016.01)
  *H01M 8/242* (2016.01)
  *H01M 8/0247* (2016.01)
  *H01M 8/0273* (2016.01)
  *H01M 8/026* (2016.01)
  *H01M 8/04007* (2016.01)
  *H01M 8/04082* (2016.01)

(52) U.S. Cl.
  CPC ....... *H01M 8/0267* (2013.01); *H01M 8/0271* (2013.01); *H01M 8/0273* (2013.01); *H01M 8/242* (2013.01); *H01M 8/026* (2013.01); *H01M 8/04007* (2013.01); *H01M 8/04082* (2013.01)

(56) References Cited

U.S. PATENT DOCUMENTS

| | | |
|---|---|---|
| 2005/0221154 A1 | 10/2005 | Guthrie |
| 2008/0107944 A1* | 5/2008 | Goebel ............... H01M 8/0271 429/434 |
| 2010/0221641 A1 | 9/2010 | Meyers |
| 2011/0020722 A1 | 1/2011 | Lake et al. |
| 2011/0117469 A1 | 5/2011 | Kanuri et al. |

FOREIGN PATENT DOCUMENTS

| | | |
|---|---|---|
| WO | 01/35477 A1 | 5/2001 |
| WO | 2007/011348 A1 | 1/2007 |
| WO | 2008/016503 A2 | 2/2008 |
| WO | 2010/082934 A1 | 7/2010 |
| WO | WO 2011/093899 * | 8/2011 |

\* cited by examiner

US 9,972,850 B2

FUEL CELL COMPONENT HAVING DIMENSIONS SELECTED TO MAXIMIZE A USEFUL AREA

STATEMENT REGARDING FEDERALLY SPONSORED RESEARCH OR DEVELOPMENT

This invention was made with government support under Contract No. CA-04-7003-00 awarded by the Department of Transportation/Federal Transit Agency. The Government therefore has certain rights in this invention.

BACKGROUND

Fuel cells are used for generating electricity based upon an electrochemical reaction. A variety of components are included within a fuel cell unit. Many of those components are typically realized in the form of a plate or sheet. There are a variety of known processes for making fuel cell components.

One challenge associated with operating a fuel cell is maintaining proper flow of the fluids within the cell stack assembly. There are known manifold and sealing arrangements to keep fluids within desired portions of a fuel cell and to prevent them from leaking into other portions of the fuel cell. The manner in which fluids flow within a fuel cell is typically directed along channels that are formed in one or more of the fuel cell components.

A typical approach at providing channels within a fuel cell component includes forming a plate or sheet and cutting or machining in grooves that establish the channels for directing fluid flow within the fuel cell. One drawback associated with this approach is that the cutting or machining process takes a significant amount of time. Such processes tend to increase the cost associated with fuel cell components.

SUMMARY

An exemplary fuel cell component includes a generally planar body having a total area defined by a length and width of the body. A first portion of the total area is occupied by a first fuel cell feature that renders the first portion unusable for at least one fuel cell function. A second portion of the total area is occupied by a second fuel cell feature that renders the second portion unusable for the fuel cell function. A third portion of the total area is considered an active area of the component that is useful for the fuel cell function. An aspect ratio of the length to the width of the generally planar body is dependent on the relationship between a dimension of the first portion and a dimension of the second portion.

An exemplary method of making a fuel cell component includes determining a dimension of a first portion of a total area of the component. The first portion has to be occupied by a first fuel cell feature that renders the first portion unusable for at least one fuel cell function. The method includes determining a dimension of a second portion of the total area that has to be occupied by a second fuel cell feature that renders the second portion unusable for the fuel cell function. Dimensions for a total length and total width of the component are selected to establish an aspect ratio of the length to the width that satisfies a relationship that is dependent on a relationship between the dimension of the first portion and the dimension of the second portion.

The various features and advantages of disclosed examples will become apparent to those skilled in the art from the following detailed description. The drawings that accompany the detailed description can be briefly described as follows.

DETAILED DESCRIPTION

Figure 1:
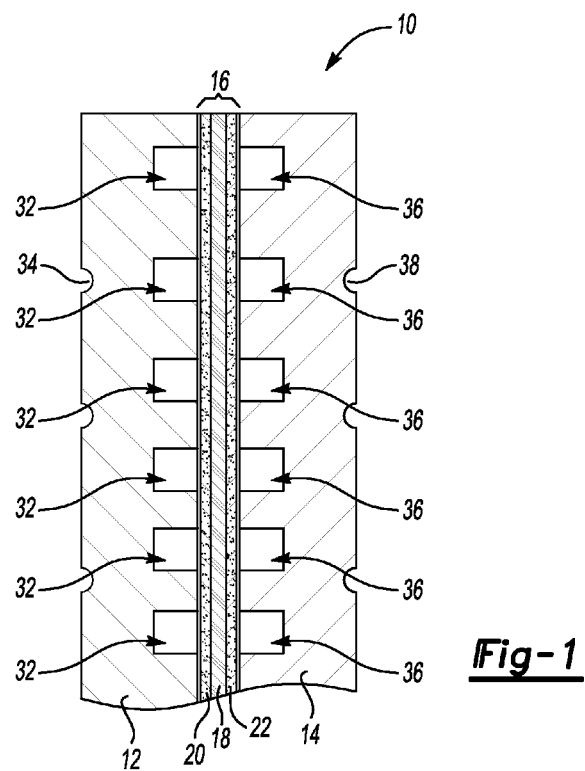
FIG. 1 schematically illustrates selected portions of a fuel cell.

FIG. 1 is a schematic, cross-sectional representation of an electrochemical cell, such as a fuel cell 10, that is useful for generating electrical energy. The example fuel cell 10 includes a plurality of components such as fluid transport plates 12 and 14. In one example, the fluid transport plate 12 is considered a cathode water transport plate and the fluid transport plate 14 is considered an anode water transport plate. The cathode and anode water transport plates 12 and 14 are at opposed sides of a membrane electrode assembly 16, which includes an electrolyte such as a proton exchange membrane 18, a cathode catalyst 20 and an anode catalyst 22. Additional known components, such as gas diffusion layers, may be included but are not shown in FIG. 1.

The cathode water transport plate 12 includes a plurality of fluid flow channels 32 that are in fluid communication with each other and the cathode catalyst 20. The example fluid transport plate 12 also includes fluid flow channels 34 that are configured to carry coolant in this example. Similarly, the anode transport plate 14 includes fluid flow channels 36 that are in fluid communication with each other and the anode catalyst 22. Coolant channels 38 are provided on the transport plate 14. In one example, the channels 32 direct an oxidant such as air within the fuel cell and the channels 36 direct a fuel such as hydrogen through the fuel cell.

For fuel cell components such as the fluid transport plates 12 and 14, that serve more than one function (e.g., reactant distribution and coolant delivery), there may be conflicting requirements associated with each of those functions such that one portion of the fuel cell component may be useful for one fuel cell function but not another. The disclosed examples demonstrate how an embodiment of this invention provides a maximum area on the fuel cell component for a selected fuel cell function by selecting an aspect ratio of the dimensions of the component to maximize that area.

Figure 2:
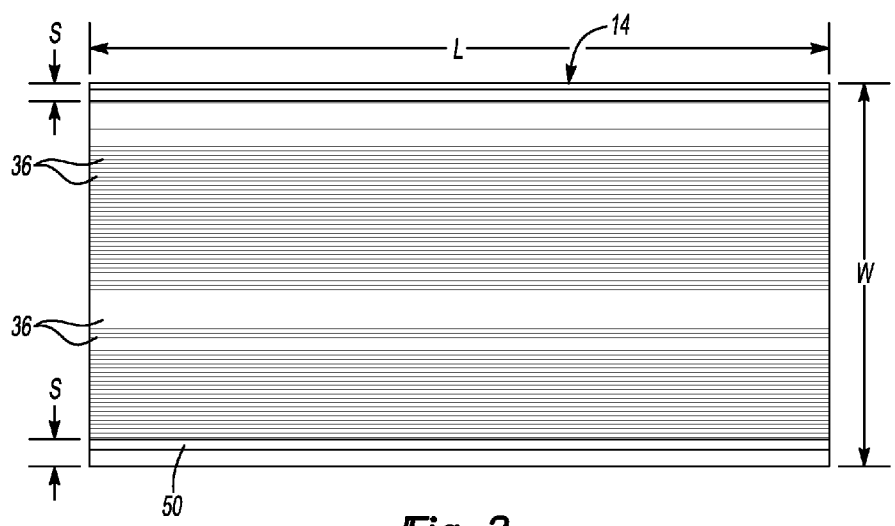
FIG. 2 schematically illustrates selected features of an example fuel cell component.

FIG. 2 illustrates an example configuration of one example fluid transport plate 14. FIG. 2 shows one side of such a plate. The plurality of channels 36 are established on one side of the plate 14. Overall, the plate 14 has a length L and a width W that establishes a total area of the plate 14. At least two edges of the plate 14 in the view shown in FIG. 2 need to be sealed to control fluid distribution through the channels 36 and within the fuel cell into which the plate 14 is incorporated. The seal areas are shown at 50 and have a dimension s along the length L. The portions 50 of the plate 14 are dedicated to the sealing function of the fuel cell component and, therefore, are not available or useful for distributing fluid along the channels 36. In other words, the portion 50 of the plate 12 is unavailable for the electrochemical reaction function.

Figure 3:
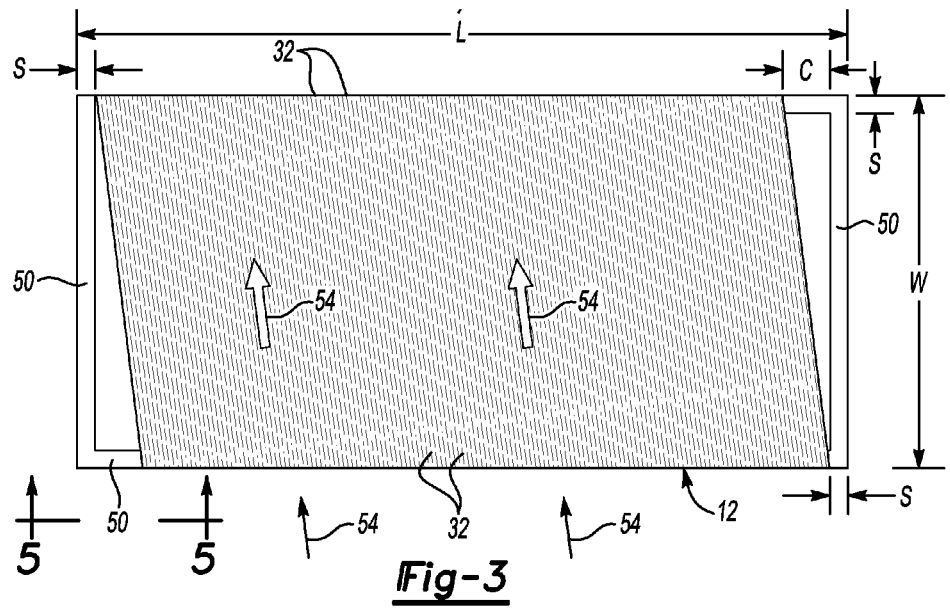
FIG. 3 schematically illustrates selected features of another example fuel cell component.
Figure 4:
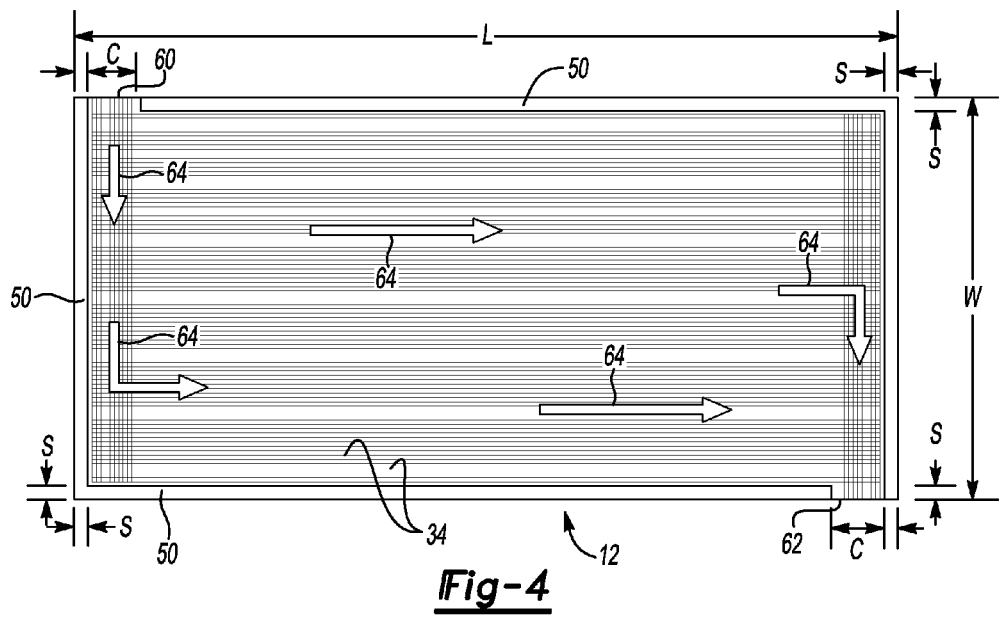
FIG. 4 schematically illustrates selected features of an opposite side of the fuel cell component shown in FIG. 3.
Figure 5:
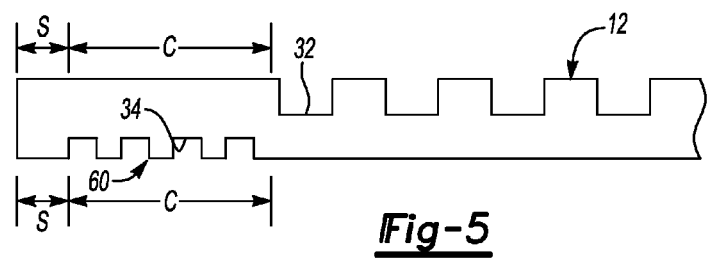
FIG. 5 is an end view of a selected portion of the example fuel cell component from FIG. 3.

FIGS. 3-5 illustrate an example configuration of an example fluid transport plate 12. FIG. 3 shows one side of an example fluid transport plate 12. FIG. 4 shows an opposite side of the same plate. FIG. 5 is an end view schematically showing features of one portion of the example plate 12.

The side of the plate 12 shown in FIG. 3 is used for reactant distribution to facilitate the electrochemical reaction within a fuel cell. Electrochemical reaction, which is the example fuel cell function, requires distribution of one reactant via channels 32 shown in FIG. 3 and of the other reactant via channels 36 shown in FIG. 2. In this example, the channels 32 direct reactant flow as schematically shown by the arrows 54. The intersection of the area on the plate 12 that is either occupied by or directly between the channels 32 and the area on the plate 14 that is either occupied by or directly between the channels 36 is considered an active area of the fuel cell 10 for the electrochemical reaction fuel cell function. As can be appreciated from FIGS. 2 and 3, the active area does not occupy the total area established by the length L and width W of the plates 14 and 12. There are regions at the top and bottom of plate 14 which are rendered inactive by the absence of channels 36, and there are regions at the left and right of plate 12 which are rendered inactive by the absence of channels 32.

Part of the total area of the plates 12 and 14 is occupied by the portions 50 of the plates that are required for sealing the edges of the plate to contain the reactant within the active portions of the plates 12 and 14. The sealing portions 50 have a dimension along the edge of the plate represented as s in the drawings. The dimension s multiplied by the overall length of the portion 50 establishes an area of the seal portion 50, which is not available for the electrochemical reaction fuel cell function.

One of the reasons why the channels 32 have the configuration shown in FIG. 3 is that the coolant distribution channels 34 on the opposite side of the plate 12 as shown in FIG. 4 include an inlet at 60 and an outlet at 62. The channels 34 are configured to direct coolant flow as schematically shown by the arrows 64 along one side of the plate 12. The manner in which the channels 32 and 34 are provided on two edges of the plate 12 can be appreciated from FIG. 5. There cannot be any overlap between the channels 32 and 34 at the corresponding edges of the plate 12 in this example. A manifold (not shown) directs the respective fluids in an intended manner. If the channels 32 and 34 overlapped at the edge shown in FIG. 5, the fluids would be mixed, which is undesirable. The presence of the inlet 60 and the outlet 62 results in the generally triangular regions or portions on the left and right (according to the drawing) sides of the plate 12 (as can best be appreciated from FIG. 3) that cannot be occupied by the channels 32.

The dimension of the inlet and outlet 62 is represented in the drawings as c. The dimension of the inlet 60 and outlet 62 contributes to a portion of the fuel cell plate 12 that cannot be used for the electrochemical reaction function. Instead, those portions of the example plate 12 are dedicated to a coolant distribution fuel cell function.

If the channels 32 were established using a cutting or machining operation that establishes one channel at a time, it is possible to use a relatively complicated channel geometry or configuration to occupy a significant area on the plate 12 while still accommodating the need to have separation between the ends of the channels 32 and 34 on the edges of the plate 12. It would be more economical however, to be able to use a faster channel formation process. One example designed according to this invention includes using a gang-milling operation for cutting or machining a plurality of the channels 32 in the plate 12 simultaneously. A gang-milling operation can significantly reduce the amount of time required for making the plate 12, which reduces the cost associated with that fuel cell component.

There are limitations, however, on gang-milling techniques that do not allow for establishing complicated geometries or configurations of the channels 34. Accordingly, as can be appreciated from FIG. 3, the channels 32 have a relatively straightforward configuration (e.g., a set of straight-parallel channels in the illustrated example).

It is useful to maximize the amount of area of the fuel cell 10 that is useful for the electrochemical reaction fuel cell function. The disclosed example includes achieving a maximum active area of the fuel cell 10 by selecting an aspect ratio of the overall length L to the overall width W that maximizes the active area available (on the involved fuel cell components) for the selected fuel cell function (e.g., electrochemical reaction).

One example approach includes using an aspect ratio r where L=rW. The overall area A of the fuel cell component is described by $A=LW=rW^2$. Therefore, $W=(A/r)^{1/2}$.

The active area a is defined by the amount of the length L that is available after the portions having the dimensions s and c are removed multiplied by the amount of the width W that remains after corresponding portions having the dimension s are removed (according to the illustrated example). It follows that the active area a is described by the equation $a=(L-2s-c)(W-2s)=(rW-2s-c)(W-2s)=rW^2-(2sr+2s+c)W+2s(2s+c)$.

A ratio of the active area a to the total area A is considered $U=a/A$. It follows that the proportion of the fuel cell component that is occupied by the active area a can be described by the equation $U=1+2s(2s+c)A^{-1}-2s(r/A)^{1/2}-(2s+c)(Ar)^{-1/2}$.

In order to maximize the active area a, the following relationship is useful. $0=dU/dr=-s(Ar)^{-1/2}+(s+c/2)A^{-1/2}r^{-1.5}$, which can be solved to maximize the active area, a yielding $r=1+c/(2s)$, where r is the aspect ratio of the overall length L to the overall width W.

Maximizing the active area for the selected fuel cell function, such as electrochemical reaction, includes selecting a length L and a width W for the fuel cell component that satisfies the relationship of the aspect ratio r that depends upon the dimension c and the dimension s. In other words, the overall dimensions of the fuel cell component are selected so that an aspect ratio of the length to the width is dependent on a dimension of a first portion of the total area that is not useable for the selected fuel cell function and a dimension of a second portion of the total area that is not useful for the selected fuel cell function. In this example, the relationship includes the dimension c divided by the dimension s.

Selecting the overall dimensions of a fuel cell component based upon a relationship of dimensions of portions of the component that are not useful for a selected fuel cell function as described above maximizes the amount of area of the fuel cell component that is useful as an active area for that selected fuel cell function. This approach allows for using different manufacturing techniques, which may reduce the cost associated with a fuel cell component. Maximizing the amount of active area on the fuel cell component allows for realizing the benefits of reduced manufacturing costs without compromising or diminishing the effective performance available from such a component.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A fuel cell component, comprising:
a generally planar body having a total area defined by a length and a width of the body;
a cooling portion of the total area being occupied by a cooling feature that renders the cooling portion unusable for at least one fuel cell function, the cooling portion of the total area including two triangular regions of the total area;
a sealing portion of the total area being occupied by a sealing feature that renders the sealing portion unusable for the at least one fuel cell function; and
an active portion of the total area being an active area of the component that is useable for the at least one fuel cell function, and
wherein the active area of the component includes a reactant flow field having a plurality of channels that extend straight from a first edge of the body to a second edge of the body opposite to the first edge of the body, and that extend at an oblique angle to the first and second edges of the body.

2. The fuel cell component of claim 1, wherein an aspect ratio of the length to the width is equal to one plus a first dimension of the cooling portion in a direction aligned with the first and second edges of the body divided by twice a second dimension of the sealing portion in the direction aligned with the first and second edges of the body.

3. The fuel cell component of claim 2, wherein:
the fuel cell component comprises a fluid transport plate assembly;
the cooling feature comprises a portion of the plate assembly configured for directing flow of a fuel cell coolant into or out of the plate assembly; and
the sealing feature comprises a seal assembly configured for sealing edges of the plate assembly.

4. The fuel cell component of claim 3, wherein the aspect ratio provides a maximum of the active area on the plate assembly given the length and the width and the first and second dimensions.

5. The fuel cell component of claim 2, wherein the aspect ratio provides a maximum of the active area on the component given the length and the width and the first and second dimensions.

6. A method of making a fuel cell component, comprising:
determining a first dimension of a cooling portion of a total area of the component that has to be occupied by a cooling feature that renders the cooling portion unusable for at least one fuel cell function, the cooling portion of the total area including two triangular regions of the total area;
determining a second dimension of a sealing portion of the total area that has to be occupied by a sealing feature that renders the sealing portion unusable for the at least one fuel cell function;
selecting a total length and a total width of the component to establish an aspect ratio of the total length to the total width;
manufacturing the fuel cell component to have the determined first and second dimensions and the selected total length and total width, and to have an active area that is useable for the at least one fuel cell function, the active area including a reactant flow field having a plurality of channels that extend straight from a first edge of the component aligned with the first and second dimensions to a second edge of the component aligned with the first and second dimensions and opposite to the first edge of the component, and that extend at an oblique angle to the first and second edges of the component.

7. The method of claim 6, wherein the aspect ratio is equal to one plus the first dimension divided by twice the second dimension.

8. The method of claim 7, wherein:
the fuel cell component comprises a fluid transport plate assembly;
the cooling feature comprises a portion of the plate assembly configured for directing flow of a fuel cell coolant into or out of the plate assembly;
the sealing feature comprises a seal configured for sealing edges of the plate assembly; and
the at least one fuel cell function comprises directing flow of fuel cell reactants such that an electrochemical reaction can occur.

9. The method of claim 8, comprising selecting the total length and the total width to maximize the active area of the component that is useable for the at least one fuel cell function given the total length and the total width and the first and second dimensions.

10. The method of claim 6, comprising selecting the total length and the total width to maximize the active area of the component that is useable for the at least one fuel cell function given the total length and the total width and the first and second dimensions.

11. The method of claim 6 wherein manufacturing the fuel cell component includes gang milling the plurality of channels.

12. The fuel cell component of claim 1 wherein:
the component includes a bipolar fuel cell plate;
the plurality of channels includes a plurality of reactant channels formed on a first major surface of the plate; and
the plate includes a plurality of coolant channels formed on a second major surface of the plate opposite to the first major surface of the plate.

13. The fuel cell component of claim 1 wherein a first one of the two triangular regions includes a coolant inlet and a second one of the two triangular regions includes a coolant outlet.

14. The fuel cell component of claim 13 wherein the fuel cell component is rotationally symmetric.

15. The fuel cell component of claim 1 wherein the active area of the component has a shape comprising a parallelogram.

* * * * *